(12) United States Patent
Dini

(10) Patent No.: US 8,337,736 B2
(45) Date of Patent: Dec. 25, 2012

(54) METHOD FOR AUTOMATICALLY PRODUCING A CONGLOMERATE STRUCTURE AND APPARATUS THEREFOR

(76) Inventor: Enrico Dini, Calcinaia (IT)

( * ) Notice: Subject to any disclaimer, the term of this patent is extended or adjusted under 35 U.S.C. 154(b) by 122 days.

(21) Appl. No.: 12/673,900

(22) PCT Filed: Sep. 17, 2008

(86) PCT No.: PCT/IB2008/002425
§ 371 (c)(1),
(2), (4) Date: Mar. 8, 2010

(87) PCT Pub. No.: WO2009/037550
PCT Pub. Date: Mar. 26, 2009

(65) Prior Publication Data
US 2010/0207288 A1    Aug. 19, 2010

(30) Foreign Application Priority Data

Sep. 17, 2007   (IT) .................................. PI2007A0108

(51) Int. Cl.
*E04G 11/22*    (2006.01)
(52) U.S. Cl. ........ 264/241; 264/255; 264/308; 264/309; 264/313; 264/317; 264/33; 264/113; 52/742.1; 52/742.13
(58) Field of Classification Search .................. 264/241, 264/255, 308, 309, 313, 317, 33, 113; 52/742.1, 52/742.13, 33, 113
See application file for complete search history.

(56) References Cited

U.S. PATENT DOCUMENTS

| | | | |
|---|---|---|---|
| 6,508,971 B2 * | 1/2003 | Leyden et al. | ................. 264/401 |
| 2001/0050031 A1 | 12/2001 | Bredt et al. | |
| 2005/0218549 A1 * | 10/2005 | Farr et al. | ...................... 264/109 |
| 2008/0001331 A1 | 1/2008 | Ederer | |
| 2008/0148683 A1 | 6/2008 | Dini | |
| 2009/0064604 A1 * | 3/2009 | Yamaguchi | .................. 52/169.6 |

FOREIGN PATENT DOCUMENTS

WO    2005097476    10/2005

* cited by examiner

*Primary Examiner* — Christina Johnson
*Assistant Examiner* — Saeed Huda
(74) *Attorney, Agent, or Firm* — Dennison, Schultz & MacDonald

(57) ABSTRACT

A method for automatically making conglomerated structures (6). The method comprises a) modelling a building structure and a containing shell about the structure by a computer using a CAD software thus obtaining a file; b) extracting sections of modelled structure and of modelled containing shell, by means of horizontal planes spaced apart of a predetermined pitch, such that a plurality of section planes is generated, said planes being sorted from below towards above with respect to the model of the structure and of the model of the shell; c) depositing by a moving unit (3) on a ground a bottom-to-top plurality of layers of granular material (22) alternate to a binding material liquid sprayed on the layers at filled areas corresponding to filled portions of the of the structure and of the containing shell, according to a predetermined path; d) vertically raising the moving unit (3) according to a pitch between a deposited layer and the following layer; e) repeating the step of depositing granulating material and repeating the step of spraying the binding material on a granulated material at filled areas of the structure and of the shell as many times as the planar cross sections into which said structure and the containing shell have been divided; f) demolishing the containing shell (5) and removing unbound granular material (7) accumulated in the shell (5), thus releasing a conglomerate structure (6) that reproduces accurately said modelled structure.

17 Claims, 10 Drawing Sheets

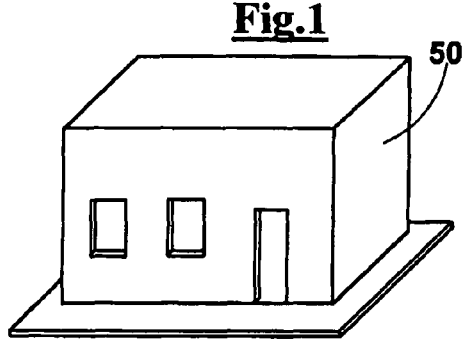
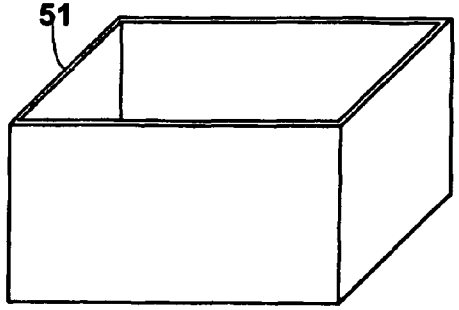
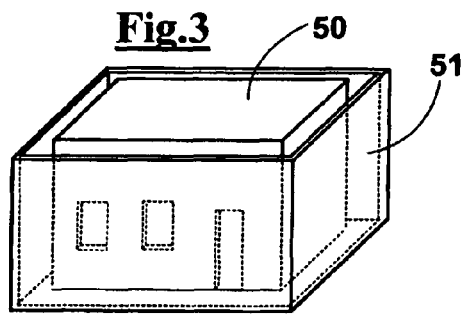
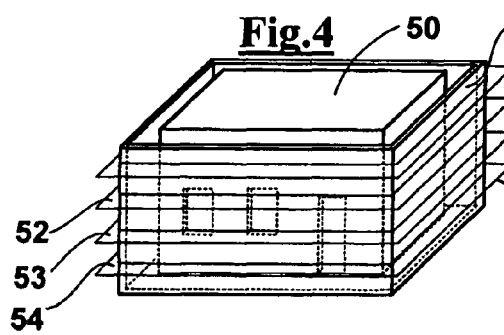
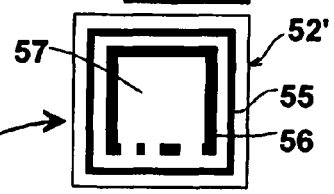
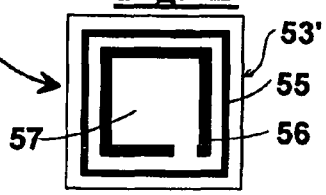
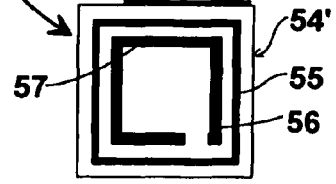

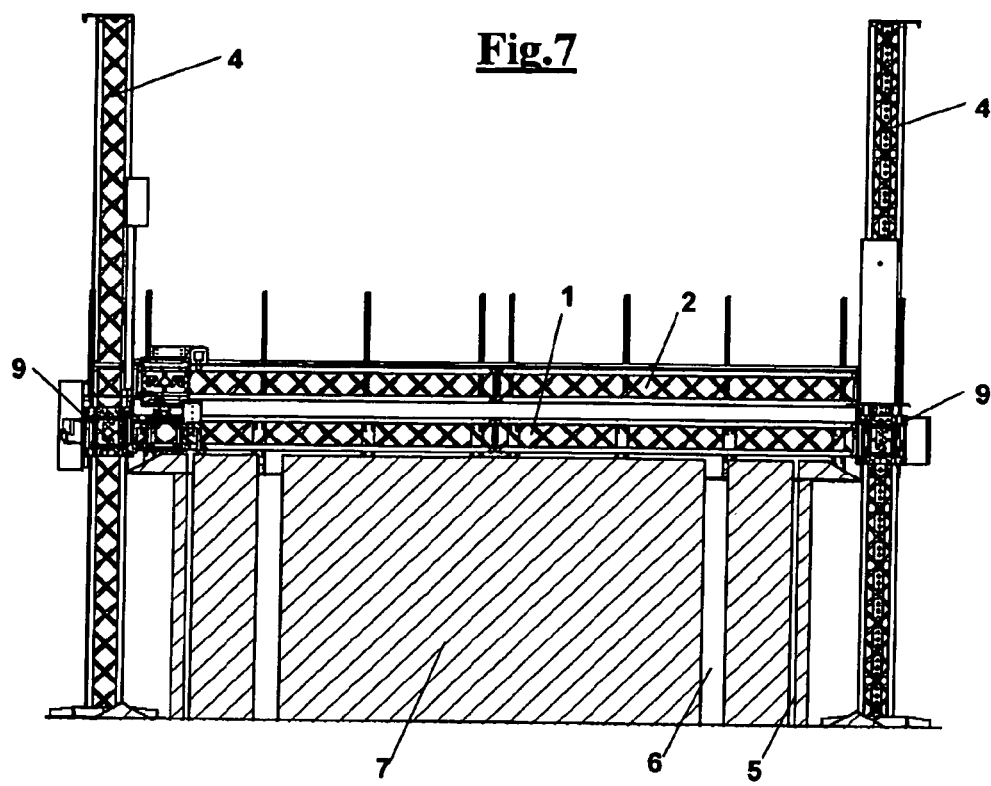
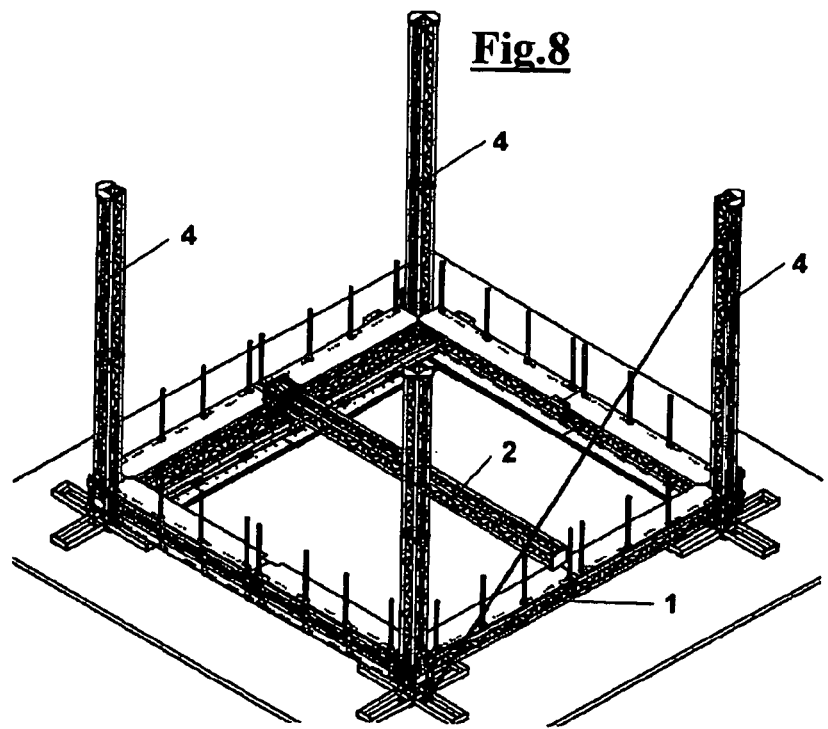

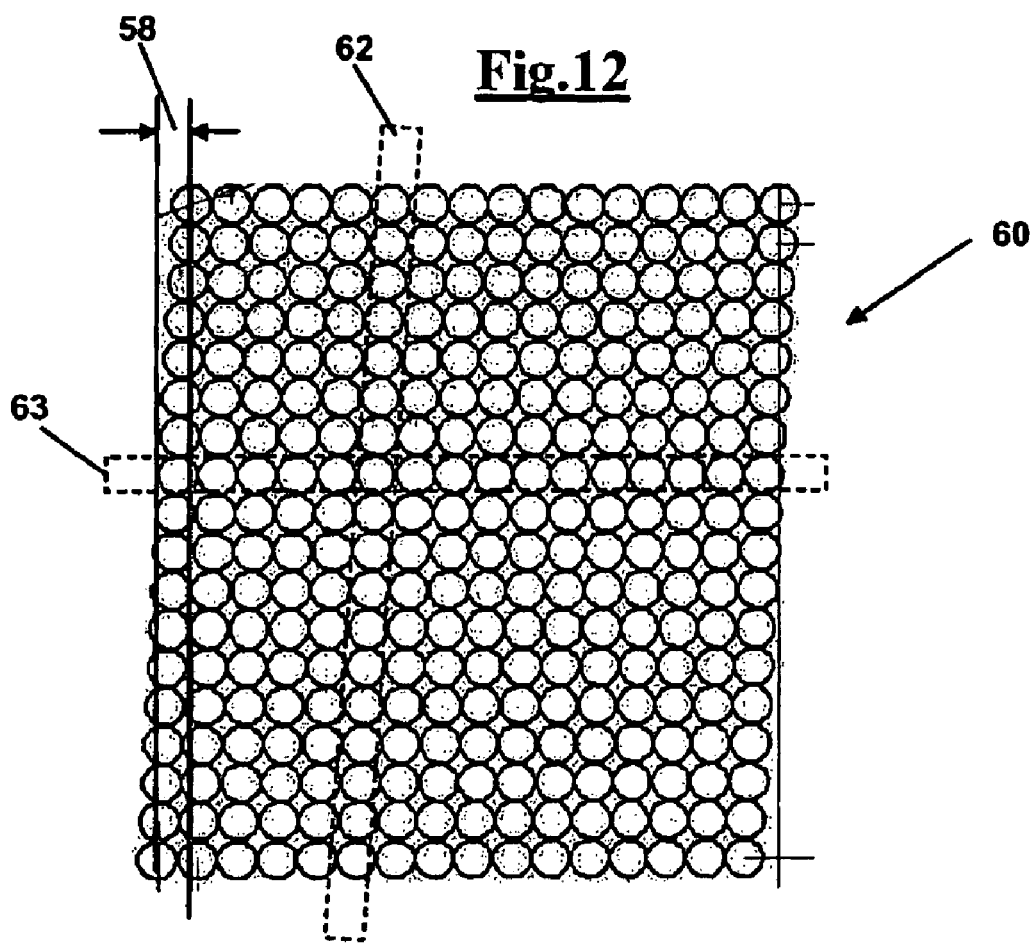

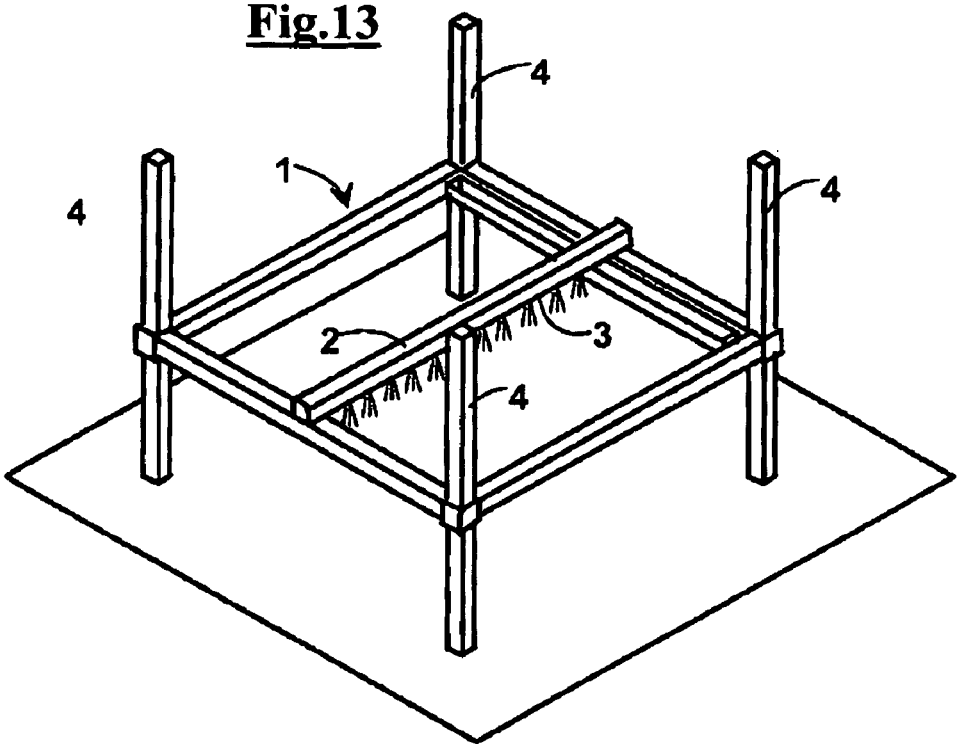
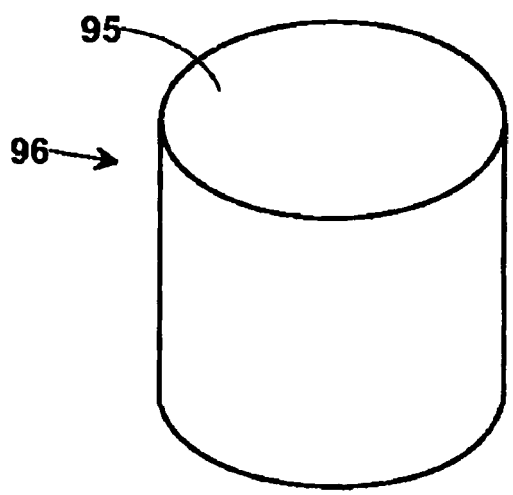
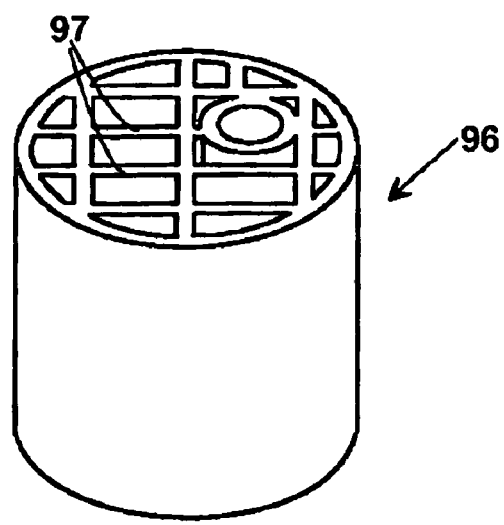

METHOD FOR AUTOMATICALLY PRODUCING A CONGLOMERATE STRUCTURE AND APPARATUS THEREFOR

FIELD OF THE INVENTION

The present invention relates to the field of the building industry and more precisely it relates to a method for automatically making building structures and other masonry constructions, in particular for structures having stone-like physical and mechanical properties.

Furthermore, the invention relates to an apparatus suitable for carrying out the method.

BACKGROUND OF THE INVENTION

A well-known method for automatically constructing conglomerate structures, in particular buildings, is described in patent application PI2005A000031. The method is carried out by a computer-aided apparatus, described in the same document, having a portion which can be moved according to the directions of three axes, one of which is vertical; this apparatus is suitable for laying alternate layers of inert granular material and a liquid binding material, in particular an epoxy resin or a polyurethane resin, creating a stone-like regions in predetermined points of a layer. All the process is carried out within side walls that define a closed perimeter.

A drawback of such method is the need of raising the side walls before laying the stone-like regions, and the disassembly of the walls after hardening, which requires relevant labour and transport costs due to the walls weight and encumbrance Furthermore, the containing side walls are designed according to a maximum volume of the structure that can be built up inside them, therefore the volume of granular material required is often much more than necessary, thus increasing supply and handling costs, as well as the removal costs of the unused granular material.

Besides, during the construction process, and in particular at the end of it, an hydrostatic-like pressure acts on the walls due to the unbound granular material, which requires complexity and robust design of apparatus structural elements to bear the resulting load.

Epoxy or polyurethane resin, suitable for use as a binder, are not environmentally preferable, both for production and waste treatment reasons; besides, they lead to a flammable objectproduct, and release toxic exhaust gas and vapour, in particular in case of fire.

Resins require also a precise binder-to granular material ratio, which remarkably increases production costs of the spraying head used for laying the binder; furthermore, resins calls for accurate and frequent maintenance and cleaning operations, and for periodically replacing parts of the spraying heads, where the granular material and the binder are mixed.

Another drawback of the use of resins as binders, is the low elasticity modulus of the resultant conglomerate, which is the cause of too much deformability of the load-bearing parts of the structure, e.g. bending and tensile deformability.

SUMMARY OF THE INVENTION

The present invention proposes some important improvements and innovations to the above described method for automatically making building structures and monolithic masonry constructions, in order to reduce the problems related to the need of a containing walls for the granular material, such that the effectiveness of the method in the practice is enhanced.

Another feature of the invention is to provide a method for obtaining such structures and monolithic masonry constructions in a rock-like conglomerate material, i.e. in a material whose microcrystalline structure is such that physical and mechanical properties have the same order of magnitude of corresponding mineral properties, in particular of marble or other building-stone properties.

A further feature of the present invention is to provide a method for obtaining the structures and monolithic masonry constructions in a material whose tensile ultimate stress and elastic modulus are such that the obtained objects are at the same time suitably stiff and lighter than the objects obtained by the method according to the state of the art.

It is still a feature of the invention, to provide such a method which also allows relevant savings of granular material.

It is also a feature of the invention to provide such a method where toxic or flammable products are not used, such that fireproof objects can be obtained.

It is another feature of the present invention to provide an apparatus for automatically producing a conglomerate structure, said apparatus in a taken apart state having overall dimensions such to be easily relocated also to a remote or impervious building yard.

These and other objects are achieved through a method for automatically building conglomerate structures, characterised in that it comprises the steps of:

modelling in a computer-aided way a building or other masonry construction structure by a CAD software, in particular by a surface- or a solid-modelling CAD software, thus obtaining a model of said structure, said model stored in a file of a computer memory;

modelling by said CAD software a containing shell about said building structure, thus obtaining a model of said containing shell, said model stored in a file of said computer memory;

extracting from said model of said structure and from said model of said containing shell a plurality of planar cross-sections on a plurality of horizontal section planes, said section planes evenly spaced at a prefixed vertical pitch, said planar cross-sections comprising filled areas and blank areas respectively corresponding to filled portions and blank portions of said structure and of said containing shell in said section planes, said section planes being sorted from below towards above;

prearranging a fixed frame on which a moving unit slides, said moving unit suitable for alternately depositing a granular material layer and spraying a binding material in a liquid form on said granular material layer;

depositing a first uniform horizontal layer of said granular material by said moving unit, said first layer having a thickness related to said prefixed vertical pitch;

spraying a predetermined amount of said binding material by said moving unit on said first layer of said granular material, said spraying being limited to said filled areas of a first planar cross-section;

vertically raising said moving unit with respect to said fixed frame according to said vertical pitch;

depositing a second uniform horizontal layer of granular material on said first layer and spraying a predetermined amount of binding material on said second layer, said spraying being limited to said filled areas of a second cross-section;

repeating said step of depositing said granular material and repeating said step of spraying a predetermined amount of binding material at said filled areas of each respective cross-section until a last layer is complete, thus obtaining at least one monolithic body corresponding to said building or other masonry construction structure, and at least one monolithic body corresponding to said containing shell, wherein the inner blank spaces are filled with loose granular material;

demolishing said containing shell and removing said loose granular material obtaining said building or other masonry construction structure.

With respect to the above-mentioned system of the prior art, according to this invention, the model of said containing shell is merged to the model of said structure thus creating one CAD-file from which cross-sections are then obtained on horizontal section planes. Using this CAD-file it is possible to actuate the moving unit to deposit a layer of the building or other masonry construction structure and a layer of the containing shell. The shell grows up together with the structure and has the function of keeping and containing the unbound loose granular material deposited at blank areas of each cross section. After depositing the last layer, i.e. the highest layer, and after hardening of the binding material, the containing shell can be destroyed, and the unbound granular material left inside the obtained structure can be removed. This way, it is not necessary to carry large containing walls and to assemble them at the building yard before starting the building process, and it is not to dismantle the walls once the structure is erected, with remarkable cost- and time-saving operations.

Furthermore, due to the method according to the invention it is not necessary to lay a granular material on a surface as wide as the plan of the side walls of the prior art apparatus. On the contrary, the layer will have to be just slightly wider than the plan of the structure to be erected, thus saving granular material and achieving a more flexible operation.

The method can be actuated by an equipment that doesn't comprise bulky and heavy containing walls, which facilitates transporting the apparatus to building yards located in impervious, remote and uninhabitated places.

A full process automation is also helpful to carry out the above described method. In particular, in order to perform said step of depositing said granular material and said step of spraying said binding material according to the model of said structure and of said shell, a calculation step is provided for calculating a program matrix used to actuate said moving unit. The moving unit has a plurality of electrically actuated valves for opening and closing respective distributing nozzles, said opening and closing performed by a control unit which operates according to said program matrix.

Preferably, the granular material is uniformly distributed in layers by an elongated hopper arranged on said moving unit, said hopper having a longitudinal narrow adjustable opening.

Advantageously, a step is provided of pressing each uniform layer of said granular material, in particular by means of a pressing element associated with said moving unit, said pressing element suitable for applying a predetermined pressure on said uniform layer of said granular material, said pressing being preferably carried out before said binding material is sprayed upon the respective layer.

Advantageously, said containing shell has vertical or sloping portions, whose cross sections form a closed shape selected from the group comprised of:
   a regular geometric shape;
   an irregular geometric shape;
   a shape suitable for externally contouring the plan of said structure, said shape located at a predetermined minimum distance from said plan.

In particular said binding material is a two-component inorganic binding material comprising:
   a liquid component which is sprayed by the moving unit;
   a catalyst.

Preferably, said liquid component contains inorganic substances, in particular chlorides.

Advantageously, the contact between said liquid component and said catalyst occurs on the deposited layer and not in the moving unit. This way, any cleaning and maintenance problem of said moving unit is avoided, since the liquid component without the catalyst does not reticulate.

Advantageously, said catalyst is a powder solid, and is dispersed among the granular material to form a mixture.

In particular the catalyst has a granulometry finer than the granulometry of said granular material. This contributes to increase stiffness of the obtained conglomerate, since the granules of said catalyst partially fill the empty spaces existing between the granules forming the granular material.

Advantageously, the liquid component has a reduced viscosity, in particular a viscosity value set between $1 \times 10^{-3}$ Ns/m and $2 \times 10^{-3}$ Ns/m. Furthermore, the liquid component has a high surface tension, in particular a surface tension value set between 0.07 N/m and 2 N/m.

This allows fast opening and closing rate of the distributing nozzles of the moving unit, according to an input signal coming from the control unit. Advantageously, said granular material, for example quarry stone, has a granulometry set between 0.01 mm and 65 mm. Material of granulometry set in such wide limits are generally easy to be procured not far from any place where a building yard may be located; furthermore, they can be derived from limestone sludge or from quarry waste material.

Advantageously, said catalyst contains metal oxides. This way, the granular material is not inert during catalysis reaction, and instead it is actively and deeply involved in the reaction. Therefore, the material obtained through the method is not an ordinary concrete material, i.e. a poor tension-resistant material in which inert granules are slightly bound together; it is instead a mineral-like material, which shows a high hardness and a high tensile strength, due to tough microcrystalline structure.

Furthermore, the catalysis reaction is so fast as to allow the conglomerate to harden in a short time, and to achieve a tensile strength close to the final tensile strength in a few hours, thus speeding up the erection of the structure.

Advantageously, a step is provided of adding high tensile strength reinforcing fibres to said mixture of said granular material and of said catalyst, to said reinforcing fibres selected from the group comprised of:
   glass fibres;
   carbon fibres;
   nylon fibres.

This way, the conglomerate obtained through the method has a diffused is tensile strength and a high stiffness, which compensates for a possible low tensile strength of the binding material or for a possible low elasticity modulus.

Advantageously, a step is provided of laying a network of a stiff, chloride-corrosion-resistant material, for example Kevlar, or carbon fibre, for reinforcing the conglomerate in the case of construction of structures like wide-span floors.

Advantageously, said step of spraying is carried out according to a predetermined path of said moving unit in a horizontal plane, said path comprising a longitudinal spraying stroke. If the nozzles are arranged along a line and spaced a pitch on the moving unit, during this stroke the binding material is deposited along lines spaced from one another at a distance that cannot be reduced under a minimum value depending upon a nozzle dimension. To overcome this limitation, said longitudinal spraying stroke can be followed by at least one further, reversely directed longitudinal spraying stroke, said reversely directed stroke preceded by a transverse shifting movement of said moving unit. The distance between the lines according to which the binding material is sprayed can then be kept as small as desired; a preferred embodiment of the method provides one or two strokes in a first direction, and corresponding strokes according in a second direction opposite to the reverse direction.

Alternatively, said step of spraying is carried out along a whole width of the layer of the granular material, or a part substantial of said width, through a plurality of nozzles arranged adjacent to each other along said moving unit.

In particular said predetermined amount of binding material is such that the binding material penetrates the whole thickness of a layer in at least one portion of said filled areas, said portion selected from the group comprised of:
- the contour of said filled areas, creating a skin with a determined thickness to fulfil the requirements for structural stability;
- a cross pattern inside said filled areas, forming recesses where unbound granular material is present,
- a combination thereof.

This way, a zone is created having a determined thickness according to static requirements, and that can be equipped with an inner partition that contains unbound granular material in recesses that can be emptied, which is useful, for example, when light structures like domes, pillars, holed walls, vaults have to be built.

Advantageously, said recesses are emptied by extracting said unbound granular material through holes made through a lower part of the structure. In particular, said holes can be made at the end of the structure construction process, or during the structure construction process.

According to another feature of the present invention, an apparatus for automatically building conglomerate structures is characterised in that it comprises:
- a means for loading a file containing a CAD model, said CAD model comprising a model of a building or other masonry construction structure, and a model of a containing shell to be erected about said building or said structure;
- a means for extracting from said CAD a plurality of planar cross-sections on a plurality of horizontal section planes, said section planes evenly spaced at a prefixed vertical pitch, said planar cross-sections comprising filled areas and blank areas respectively corresponding to filled portions and blank portions of said structure and of said containing shell, said section planes being sorted from below towards above;
- a fixed frame on which a moving unit slides, in particular a bridge crane unit having a bridge sliding on horizontal guides;
- a lifting means suitable for bearing said horizontal guides and for vertically shifting said horizontal guides according to said predetermined vertical pitch;
- a depositing means for depositing layers of granular material, said granular material layers having a thickness related to said prefixed vertical pitch, said depositing means associated with said moving unit;
- a spraying means for spraying said binding material on each said respective layer of granular material at said filled areas of each section plane, said filled areas comprising portions of said building or other masonry construction structure and portions of said shell, said spraying means associated with said moving unit.

Advantageously, said moving unit slides along a bridge, said moving unit moving substantially in a horizontal plane according to a predetermined path.

Advantageously, said depositing means comprises a hopper.

In particular said moving unit comprises a plurality of nozzles for distributing the binding material, said nozzles matrix-like arranged according to a plurality of rows and to a plurality of columns, in particular said nozzles actuated independently from one another.

In particular said rows of said matrix are spaced apart at a distance from each other in order to form an overall distance substantially equal to the print width covered by each nozzle. This avoids uneven binding material distribution due to nozzle dimension, by preventing the binding material supplied through a nozzle from overlapping the binding material already sprayed through an adjacent nozzle.

Advantageously, said nozzles are fed by respective metering means, in particular respective volumetric metering means.

Preferably, said lifting means comprises:
- an upright for each end of said guides;
- a slide moving along each upright;
- a lifting means suitable for moving said slide along said upright.

Advantageously, said guide belongs to a horizontal frame.

Advantageously, said lifting means of said horizontal frame comprises at least one vertical upright, in particular a vertical upright for each angle of the perimeter of said horizontal frame, in particular four uprights in case of a horizontal frame having a rectangular perimeter.

In particular said lifting means comprises a step motor, each step equal to said predetermined vertical pitch.

Alternatively, said lifting means comprises a linear actuator, for example an electric or an hydraulic linear actuator, operating step by step according to said predetermined vertical pitch, said actuator associated with a plurality of pins which may be inserted/extracted in/from respective transversal holes of said upright.

Advantageously, said apparatus comprises a plurality of containing side elements, or "skirts", said skirts externally surrounding said containing shell, said skirts integral to said horizontal frame, wherein said skirts scrape the outer surface of said containing shell while said containing shell is being built, and collect the granular material falling outside said containing shell.

In particular said skirts comprise a substantially horizontal portion or a portion sloping towards said granular material containing shell and a substantially vertical portion which stabilises said containing shell during the hardening of said containing shell. More in detail, said skirts that are integral to said horizontal frame scrape the outer surface of said containing shell collecting the granular material deposited out of the shell.

According to a further feature of the present invention, the above-mentioned objects are achieved by a method for automatically building conglomerate structures, characterised in that it comprises the steps of:
- modelling in a computer-aided way a building structure by a CAD software, in particular by a surface- or a solid-modelling CAD software, thus obtaining a model of said structure, said model stored in a file of a computer memory;
- extracting from said model of said structure a plurality of planar cross-sections on a plurality of horizontal section planes, said section planes evenly spaced at a prefixed vertical pitch, said planar cross-sections comprising filled areas and blank areas respectively corresponding to filled portions and blank portions of said structure in said section planes, said section planes being sorted from below towards above;

prearranging a fixed frame on which a moving unit slides, said removable unit suitable for alternately depositing a layer of a granular material homogeneously mixed with a catalyst in the form of a powder, said removable unit suitable for spraying a binding material in a liquid form on said granular material layer according to said filled areas of said structure;

depositing by said moving unit a uniform horizontal first layer of said granular material homogeneously mixed with said catalyst in the form of a powder, said first layer having a thickness related to said prefixed vertical pitch;

spraying by said moving unit a first layer of a liquid component suitable for chemically reacting with said catalyst in the form of a powder, upon said first layer of said granular material, said spraying being limited to said filled areas of a first section plane;

vertically raising said moving unit with respect to said fixed frame according to said vertical pitch to form a further layer of said granular material and of said binding material;

repeating said step of depositing said granular material and said catalyst and repeating on said deposited granular material and said catalyst said step of spraying said liquid component at said filled areas as many times as the planar cross sections into which said structure has been divided, each of said times for a different and consecutive section plane until a last layer is complete;

removing unbound granular material releasing the obtained conglomerate structure, which reproduces accurately said modelled structure.

According to a still further feature of the present invention, the above-mentioned objects are achieved by a method for automatically building conglomerate structures comprising the steps of:

modelling in a computer-aided way a building structure by a CAD software, in particular by a surface- or a solid-modelling CAD software, thus obtaining a model of said structure, said model stored in a file of a computer memory;

extracting from said model of said structure a plurality of planar cross-sections on a plurality of horizontal section planes, said section planes evenly spaced at a prefixed vertical pitch, said planar cross-sections comprising filled areas and blank areas respectively corresponding to filled portions and blank portions of said structure in said section planes, said section planes being sorted from below towards above;

prearranging a fixed frame on which a moving unit slides;

depositing by said moving unit a uniform horizontal first layer of said granular material, said first layer having a thickness related to said prefixed vertical pitch;

spraying by said moving unit a first layer of a liquid component upon said first layer of said granular material, said spraying being limited to said filled areas of a first section plane;

vertically raising said moving unit with respect to said fixed frame according to said vertical pitch to form a further layer of said granular material and of said binding material;

repeating said step of depositing said granular material and said catalyst and repeating on said deposited granular material and said catalyst said step of spraying said liquid component at said filled areas as many times as the planar cross sections into which said structure has been divided, each of said times for a different and consecutive section plane until a last layer is complete;

removing unbound granular material releasing the obtained conglomerate structure, which reproduces accurately said modelled structure, wherein said binding material is an inorganic two-component binding material comprising:

a liquid component containing inorganic substances, in particular chlorides;

a catalyst, based on metal oxides.

BRIEF DESCRIPTION OF THE DRAWINGS

The invention will be made clearer with the following description of an exemplary embodiment thereof, exemplifying but not limitative, with reference to the attached drawings wherein:

FIG. 1 shows a perspective view of a model of a structure to be erected, obtained by a solid-modelling CAD software;

FIG. 2 shows a perspective view of a model of a containing shell to be created about said building, obtained by a solid-modelling CAD software;

FIG. 3 shows in a perspective view an exemplary building and a shell at the end of their construction;

FIG. 4 shows the building and the shell of FIG. 3, cut according to consecutive section planes used to progressively raise the building, and FIGS. 4A-4C show the corresponding conglomerate-filled areas and empty areas containing the unbound mixture for each section plane of FIG. 4;

FIGS. 7 and 8 show a cross sectional view and a perspective view of a preferred exemplary embodiment of such an apparatus in two respective operating steps;

FIG. 12 shows an example of an arrangement of nozzles of a spraying head of such an apparatus;

FIG. 13 shows an alternate exemplary embodiment of an apparatus according to the invention, wherein the spraying head is integral to a bridge crane and extends along the whole length of the bridge;

FIGS. 14 and 15 show respectively a cross section of a column filled with the granular material, obtained according to the invention, and a cross section having inner partition that can be emptied, useful for lightening and making cheaper the structure;

Figure 5:
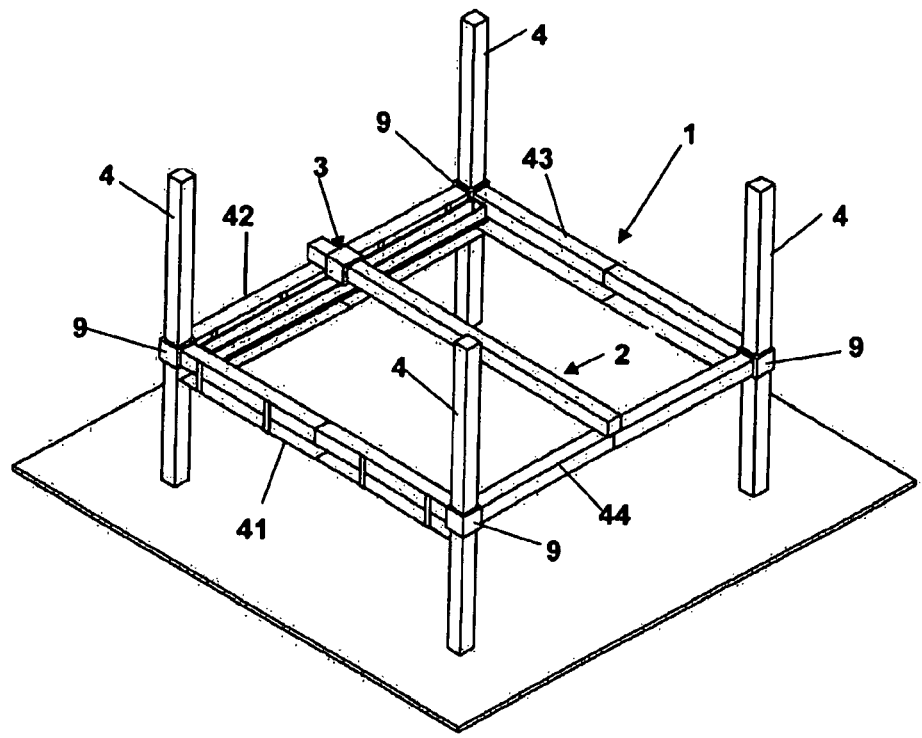
FIG. 5 shows a perspective view of an example of an apparatus according to the invention, before depositing the granular material and spraying the binding material.

FIGS. from 17 to 21 show a succession of steps performed by a device used for lifting the horizontal frame according to a predetermined pitch;

FIGS. from 22 to the 25 show a succession of strokes of a spraying head for depositing the binding material on a layer of granular material.

DESCRIPTION OF THE PREFERRED EXEMPLARY EMBODIMENT

As shown in FIGS. 1 to 4, a method for automatically building conglomerate structures provides a first step of computer aided modelling operation of a building or other masonry construction structure 50 by a solid modelling CAD software, creating a file which contains a model of the structure 1 to be erected. Besides the model of the structure 50, the present method provides a computer aided modelling of a containing shell 51, (FIG. 2), which surrounds the model of the structure 50, as shown in FIG. 3. The model of this shell 2 provides an open upper side, and has preferably vertical walls, for example four vertical walls, such that it looks like a box containing the structure to be erected. The model of the containing spell 51 can be manually drawn about the model of the structure 50, or automatically drawn by a preset function of the program; in particular, the containing shell is spaced at a prefixed distance from the building.

The following step of the method consists in extracting a plurality of planar cross-sections 52', 53', 54', of both the model of the structure 50 and the model of the containing shell 51 on a plurality of horizontal section planes 52, 53, 54, being sorted from below towards above and evenly spaced at a prefixed vertical pitch. The cross-sections comprise filled areas 55, 56 and blank areas 57; the filled areas correspond to sections of the model of the structure 56 and of the containing shell 55. Each section plane 52, 53, 54 contains therefore a filled ring-shaped area 55 along the contour corresponding to the section of the containing shell and one or more filled areas 56 contained in the ring and corresponding to the section of the structure.

Thereafter, each cross section 52', 53', 54' is associated with a calculated program matrix whose cells corresponds each to a point of the cross section to which the matrix is associated. In particular a point of a filled area 55 or 56 of a cross section corresponds to a cell of the matrix which has an "open" value, whereas a point of a blank area 57 corresponds to a cell of the matrix having a "close" value. The program matrix is sent to an apparatus according to the invention, which is suitable for carrying out the above described steps of the method, automatically obtaining the conglomerate structure diagrammatically shown in FIGS. 1 to 4.

Such apparatus, described hereinafter and diagrammatically shown in FIGS. 5 to 9, deposits alternately a layer of granular material on the whole working area, and a liquid binding material, the latter being sprayed only at the filled areas 55 and 56 of each section plane. As an example, the binding material is a two-component inorganic binding material comprising a liquid component, which contains inorganic substances, in particular chlorides, and contains also a catalyst based on metal oxides.

The above described depositing can be carried out by driving a spraying head 3 comprising a plurality of nozzles 20 arranged according to a prefixed number of rows and of columns.

The apparatus has a structure consisting of four uprights 4, which can be fixed to the ground in an appropriate way; the uprights support a rectangular horizontal frame 1 having sides 41-44. The frame 1 is coupled by means of guides 9 to the uprights 4, such that a translation of the frame 1 is allowed according to a predetermined vertical pitch, to which the thickness of the layer of granular material to be deposited is related; the thickness is selected to optimize the depth of penetration of the binding material in the layer of the just deposited granular material.

Each layer of granular material has a thickness equal to the vertical pitch between two consecutive section planes, in such a way that the model can be accurately reproduced. The step of depositing a layer of an inert granular material and of spraying a predetermined amount of a binding material at the filled areas 55 and 56 of the section planes is repeated for each section plane of the model of structure 50 and containing shell 51, from the lowest to the highest layer.

Figure 6:
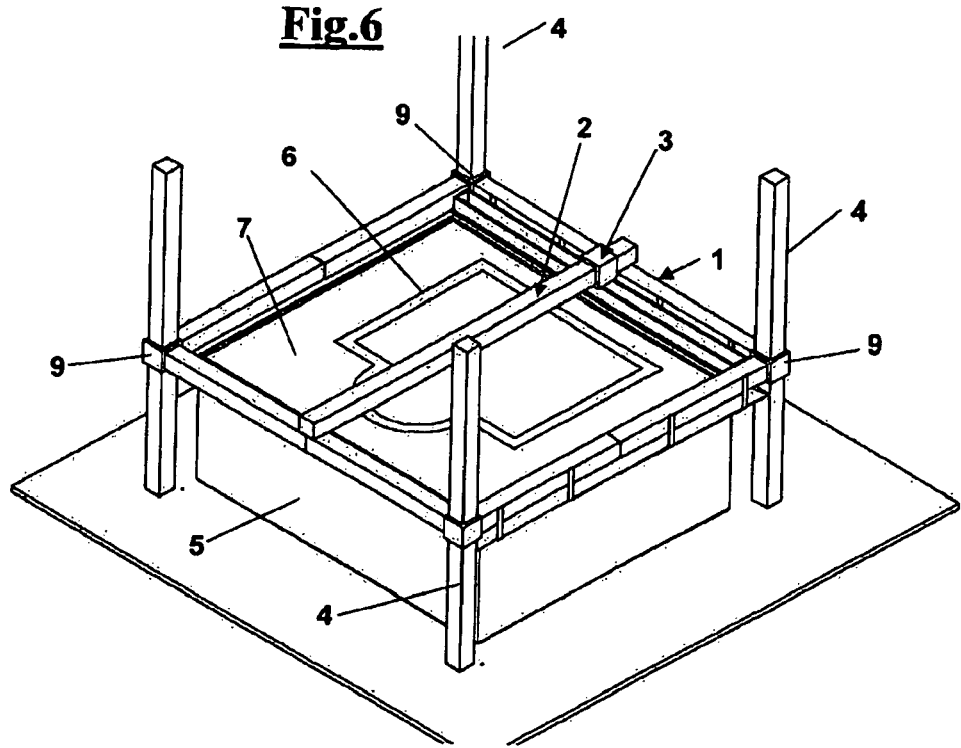
FIG. 6 shows such an apparatus during the construction of a conglomerate building structure inside a containing shell, where both the building structure and the containing shell are obtained by the method according to the invention.

Once the step of spraying a predetermined amount of binding material on a plane has been achieved, the horizontal frame 1 is lifted up the above mentioned pitch. This way, repeating the above described steps for all the section planes, a hardened shell structure 5 is obtained, containing inside the building structure 6, submerged by a mass of unbound granular material 7 which fills the shell 5. FIG. 6 shows an intermediate state of the process. The vertical translation movement can be obtained by an electromechanical servomechanism 13 comprising a rack or funicular transmission.

Alternatively, as described hereinafter with reference to FIGS. 16 to 21, an electric linear actuator is provided which operates step-by-step, each step being equal to the predetermined vertical pitch, and is associated with a plurality of pins 107 which can be inserted/extracted into/from corresponding transverse holes 105 made in an upright 4.

Figure 9:
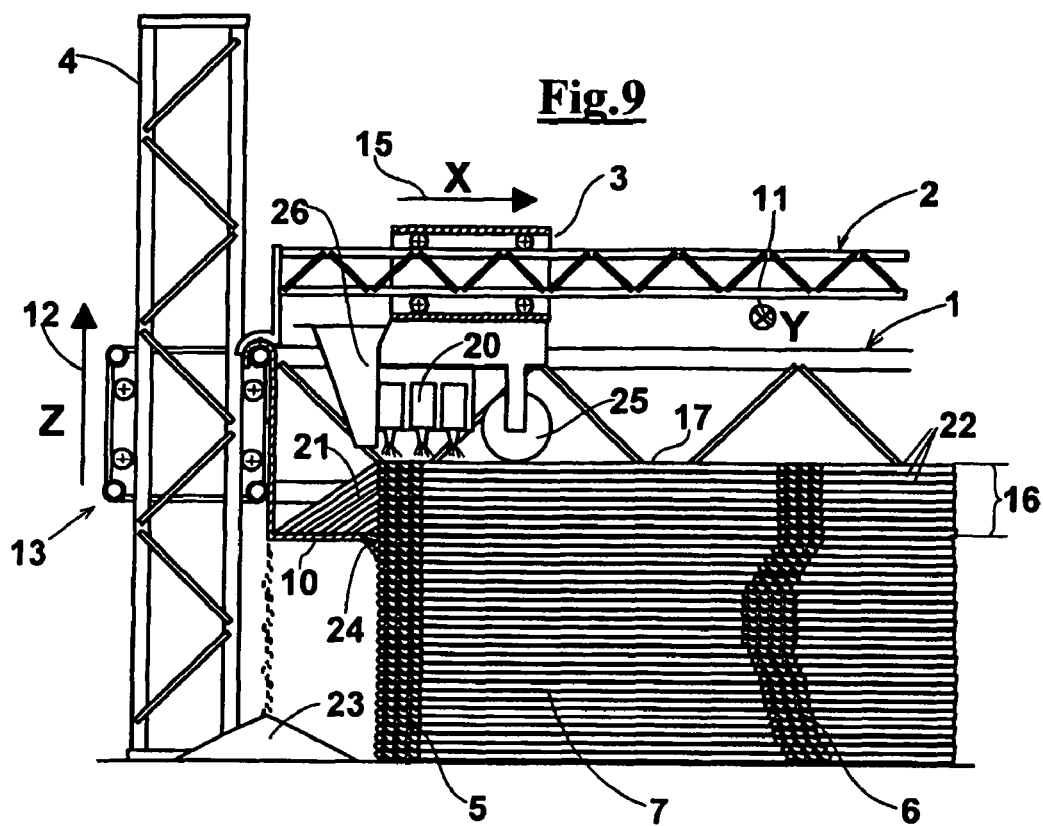
FIG. 9 shows a cross sectional view of a portion of the apparatus according to the invention, where a hopper, nozzles, skirts and pressing rollers are shown.

A bridge crane 2 mounted on frame 1 can slide parallel to sides 41-44. On the bridge crane 2 a hopper 26 is provided, which supplies the "mixture" contained in an uniform thickness layer of during the movement of the bridge crane 2 (FIG. 9).

One or more rows of nozzles 20 are arranged on the bridge crane 2 for spraying the binding material according to a prefixed pattern. Each nozzle 20 has a solenoid on/off valve controlled by the computer independently from the valves of the other nozzles.

Figure 22:
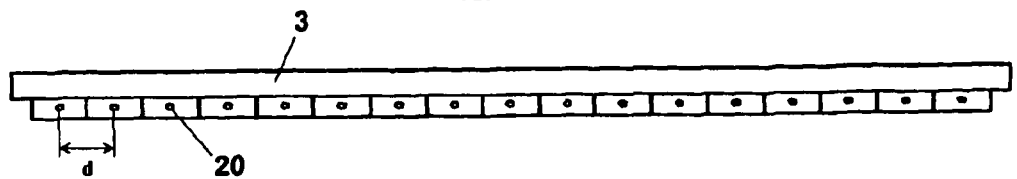
Figure 23:
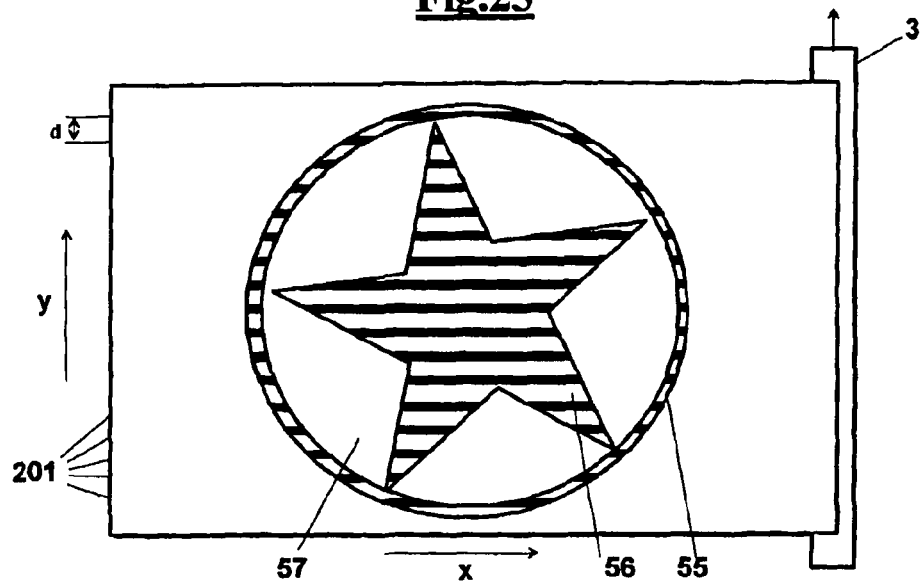
Figure 24:
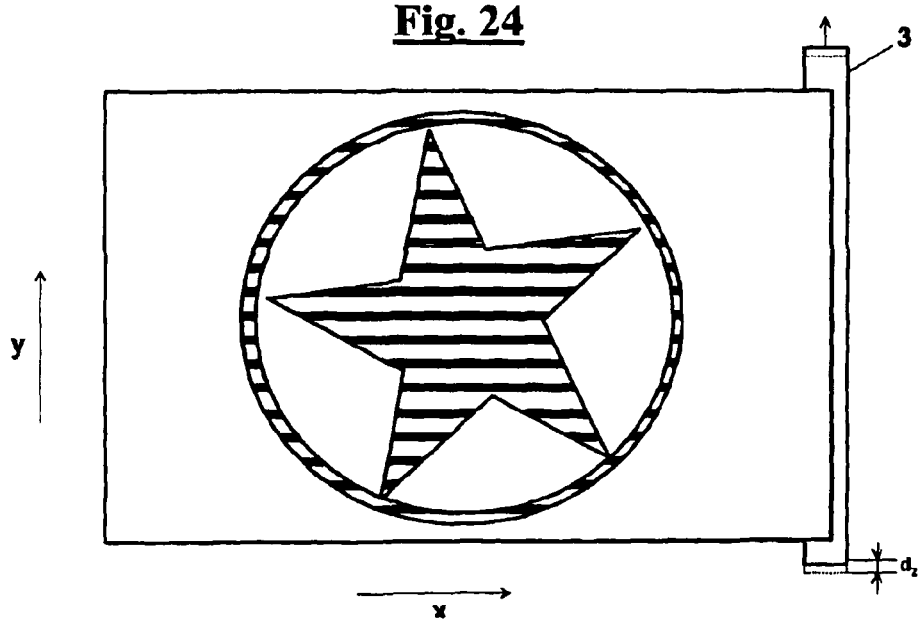
Figure 25:
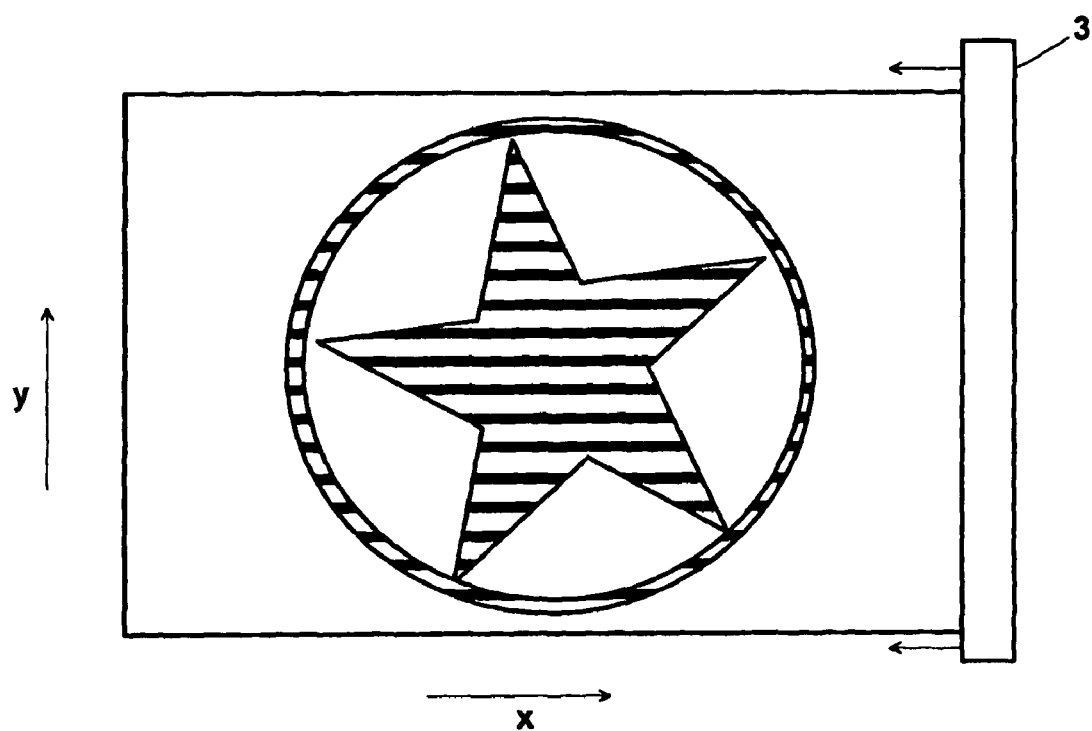

In a preferred exemplary embodiment, shown in FIGS. 13 and 22, the nozzles 20 are spaced at a predetermined distance along a single row on the moving unit 3; the distance cannot exceed the lateral dimension of a nozzle. In this case, the spraying of the binding material is carried out according to a predetermined path of the moving unit, in a horizontal plane. The path comprises always at least one spraying stroke (FIG. 24) parallel to a longitudinal axis x (FIG. 23); this stroke may be followed by further spraying strokes parallel to the same X axis and alternately oriented according to the direction of the X axis and to the reverse direction. In this case a movement $d_2$ (FIG. 24) of said moving unit is provided in a transversal direction y before any following spraying stroke. During the first stroke the binding material is deposited along the lines 201 spaced apart the pitch d, which cannot be less than a minimum value related to the size of nozzles 20. The distance between the lines 201 along which the binding material is sprayed can then be kept as small as desired, in particular they can be set at one half or at one quarter the pitch d.

The frame 1 has a shelf, i.e. a ledge or a skirt 10 below the bridge crane 2 and about the whole shell 5; the skirt 10 is located at such a vertical distance 16 (FIG. 9) from the layer being deposited 17 such that all lower layers 7 are already hardened where the binding material has been deposited, and can therefore bear the weight of the upper layers.

The skirt 10 is intended to collect the still unbound granular mixture 21 deposited during the previous strokes of the bridge crane and exceeding the edge of the contour of shell portion 5 which has already hardened to a predetermined extent. The mixture piles up on the skirt 10 with a slope perpendicular to the force resulting from the combination of gravity and of the tangential friction forces as far as it falls through suitable openings at the outer edge of the skirt to form a heap 23 about shell 5.

A moving containing element 24 is intended to scrape and to prevent the mixture from leaking between the skirt 10 and the external wall of the already hardened shell 5.

Therefore, there is no need of a special formwork to contain the granular material, achieving the above mentioned advantages.

At the end of the construction, the unbound granular material 7 is removed, and the containing shell 5 is destroyed, revealing the obtained building structure 6.

As above synthetically described, the spraying head 3 slides along the bridge 2 parallel to the axis x in order to spray the binding material in a prefixed way. The nozzles 20 (FIG. 9) are opened only at the filled areas of the cross section. The horizontal frame 1 moves in a vertical direction Z as indicated by the arrow 12 according to a predetermined vertical pitch. In particular the horizontal frame 1 slides vertically along four uprights 4. This way, by the combination of the movement of the spraying head 3 in the longitudinal direction and in the transversal direction a movement is obtained in a horizontal plane, for example as XY, whereas the vertical movement of the frame provides a third coordinate Z.

FIGS. 7, 8 and 9, show a possible exemplary embodiment of an apparatus according to the invention wherein the uprights 4, the horizontal frame 1 and the bridge 2 are formed by trusses.

FIG. 9 shows diagrammatically a partial view of an apparatus according to the invention. Each upright 4 as well as the horizontal frame 1 are formed by a network structure, that, in the exemplary embodiment of FIG. 9 has a rectangular shape and consists of four trusses joined to one another by an end. The horizontal frame 1 moves vertically according to the arrow 12 which represents the axis Z.

The bridge 2, also consisting in a truss, slides on the horizontal frame 1, according to the arrow 11 which represents the axis Y.

The spraying head 3 slides horizontally along the bridge 2 according to arrow 15 which represents the axis X, perpendicular to direction 11.

In FIG. 9 the apparatus according to the invention is in an intermediate state of the process, since it has deposited a plurality of layers of granular material 22 and it has sprayed the binding material at the filled areas of each layer 22 corresponding to the filled areas of the section planes of the structure 6 and of the containing shell 5.

Outside the containing shell 5 a skirt 10 is present which surrounds the whole outer perimeter of the containing shell 5, in particular it has an opening that copes with the shape of the outer perimeter of the containing shell and is integral to the horizontal frame 1, so that when the horizontal frame 1 has moved upwards also skirt 10 has been raised up to a corresponding height. Therefore, if skirt 10, that is arranged about the containing shell 5, has a brush with bristles 20, when skirt 10 moves upwards, the outer surface of the containing shell 5 is brushed and cleaned from granular material. Furthermore, the skirt 10 is operatively arranged at a distance below the layer 17 being deposited, and, at a distance multiple of the predetermined pitch and corresponding to the thickness of a hardening zone. The excess granular material 21, exceeding beyond the outer perimeter of the containing shell 5, is held on the skirt 10 forming a heap which surface has a natural slope according to gravity and friction interactions.

As new layers are deposited, a portions of the shell pertaining lower layers hardens and a hard wall is therefore created which forms a sort of quarterdeck that retains the granular material.

The construction of this containing shell has the advantage of reducing the cost of the apparatus, since it is not necessary to prepare containing walls for the granular material. Another advantage is a remarkable weight reduction of the apparatus, and the elimination of stiffening means that are no long necessary due to size reduction of the bridge crane structure, that bears its own weight and no longer contain the thrust of the granular material. Also the apparatus transport costs are reduced, due to the reduced machinery encumbrance. Therefore, the assembling steps of the apparatus require a shorter time.

Figure 10:
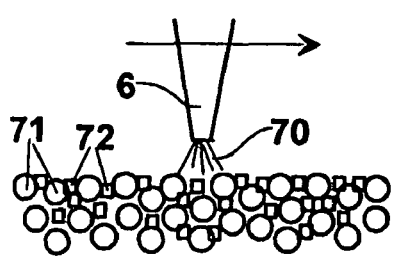
FIG. 10 shows the application of a binding material on a layer of deposited granular material, where the granular material contains a catalyst in the form of a powder.

As shown in FIG. 10, in a possible exemplary embodiment, the catalyst 72 is in the form of a powder and is premixed to the granular material 71 deposited in each layer, whereas the component 70 is liquid and has a reduced value of viscosity. The use of the catalyst in powder 72 prevents advantageously the nozzles 6 from being plugged; otherwise the nozzles 6 could be plugged due to the reticulation reaction of the catalyst and of the component flowing together inside it.

Figure 11:
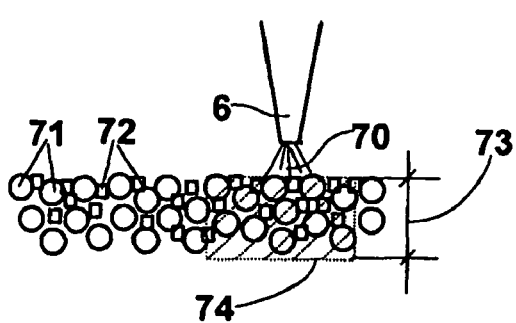
FIG. 11 shows a zone where the component present in the layer of granular material interacts with the catalyst, as shown in FIG. 10.

FIG. 11 shows how the liquid component 70 diffuses through the deposited granular material 71 and 72. In each stroke of the spraying head and therefore of the nozzle 6, the liquid component penetrates through the deposited material a depth 73 set between 1 mm and 5 mm, in particular set between 2 mm and 4 mm, preferably set to 3 mm.

A preliminary dispersion in the granular material of fibres, e.g. glass fibres, carbon fibres, nylon fibres, or any fibres having a suitable tensile strength, not shown in the pictures, may usefully be provided. The conglomerate is therefore given an uniform tensile strength, thus compensating for possible low modulus of elasticity or tensile strength value of the binding material, and the final object has an high overall tensile strength and stiffness.

This casting procedure requires a spraying head 3 suitable for tracking any pattern described by the couple of coordinates X and Y.

Otherwise, in FIG. 12 a particular exemplary embodiment is shown of such a spraying head 3, in particular a multiple nozzle spraying head, for delivering the binding material. Such a spraying head 3 has a matrix-like structure consisting of a matrix 60 of nozzles 61 arranged in a plurality of rows 62 and in a plurality of columns 63, where the columns 63 are evenly spaced apart at a distance from each other, in order to form an overall distance 64 substantially to equal to the print width covered by each nozzle.

FIG. 13 shows an alternate exemplary embodiment of the apparatus according to the invention, where the spraying head 3 doesn't slide with respect to the bridge 2 but is integral to it and extends for all the length of the workspace. The head 3, with the bridge 2, slides along the guide 80, then along axis Y. In other words the head 3 has a plurality of nozzles distributed homogeneously for all its length and such nozzles can be operated independently from each other for spraying binding material at the filled areas of each plane.

FIGS. 14 and 15 show respectively a cross section 95 of a structure, filled with granular material 96 obtained according to the invention, and a cross section with internal partitions suitable for lightening the structure 96 of granular material. Therefore, the binding material can be sprayed at the contour of the filled areas and, optionally and in addition, according to a crossed pattern 97 inside the above described filled areas. A "skin" is then created having a thickness appropriate and variable according to static requirements and that may be equipped with an inner partition that contains unbound granular material in recesses that are emptied when the loose granular material is removed through prearranged emptying holes, or emptying holes to be made at the end of the process. This feature allows a remarkable saving of binding material, which otherwise could generate high production costs due to the price of the binding material.

Furthermore, inner recesses allow lightening the object 96 in the regions of the structure where the weight is useless or even disadvantageous, such as for example, in vault regions, protruding regions and top regions of a building. The ultimate object is therefore given a sponge-like, high strength and light structure.

Figure 16:
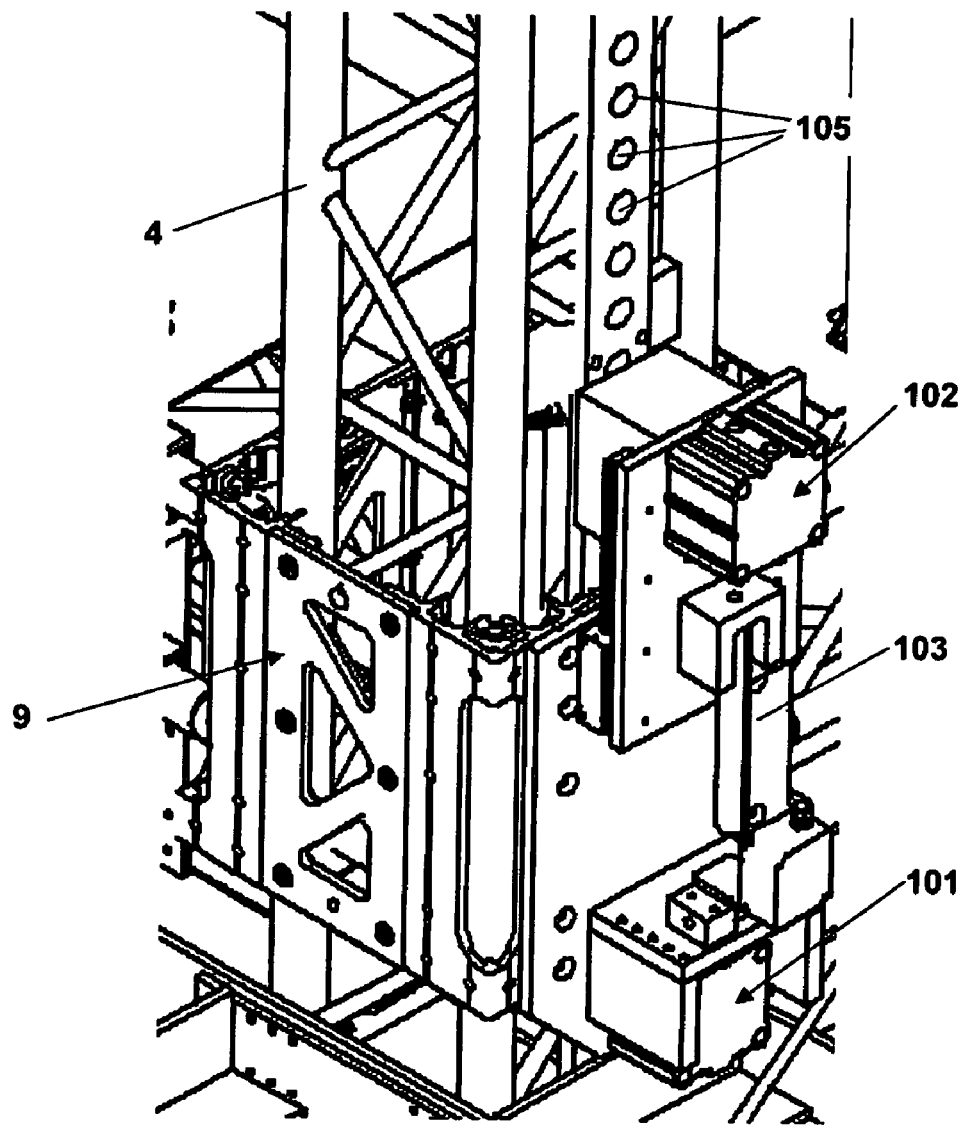
FIG. 16 shows an example of a device used for lifting a horizontal frame according to a predetermined pitch.

FIG. 16 shows an advantageous lifting device 100 for raising the horizontal frame according to a predetermined pitch. The device comprises two hydraulic or pneumatic pistons 101 and 102, suitable for being inserted in respective holes 105, 106 and 107, which are vertically aligned along the uprights and substantially horizontal, when the pistons are in an extended position. The two pistons 101 and 102 can be translated parallel to each other to the uprights along a guide 104 and the relative movement of translating among them is operated by a lifting piston 103 arranged parallel to the uprights.

FIGS. 17 to 21 describe a vertical step movement according to the thickness of a layer of granular material deposited on each level.

Figure 17:
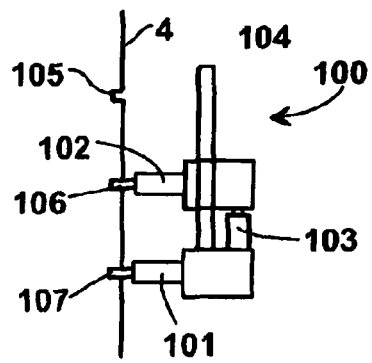
Figure 18:
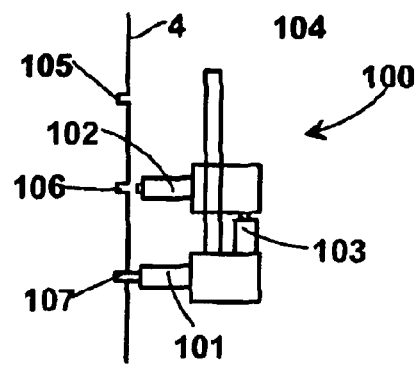
Figure 19:
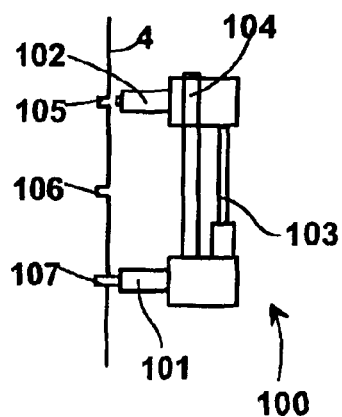

In FIG. 17 the pistons 101 and 102 are inserted respectively in adjacent holes 107 and 106, therefore the pistons 101 and 102 are at a minimum relative distance. In FIG. 18, the piston 102 is extracted and in FIG. 19 the lifting piston 103 extends up to positioning the piston 102 at the hole 105.

Figure 20:
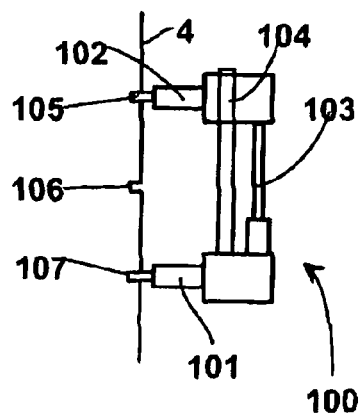
Figure 21:
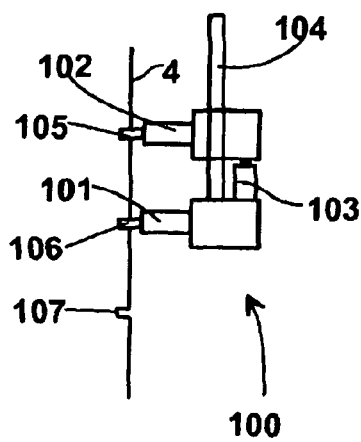

In FIG. 20 the piston 102 protrudes and engages with the hole 105. In FIG. 21, the piston 101, once protruded, is translated upwards in an extraction step of the lifting piston 103 and, when the piston 101 is in front of the hole 106, it is protruded engaging with this hole.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A method for automatically building conglomerate structures, comprising:
    modelling in a computer-aided way a building or other masonry construction structure by a CAD software by a surface- or a solid-modelling CAD software, thus obtaining a model of said structure, said model stored in a file of a computer memory;
    modelling by said CAD software a containing shell about said building structure, thus obtaining a model of said containing shell, said model stored in a file of said computer memory;
    extracting from said model of said structure and from said model of said containing shell a plurality of planar cross-sections on a plurality of horizontal section planes, said section planes evenly spaced at a prefixed vertical pitch, said planar cross-sections comprising filled areas and blank areas respectively corresponding to filled portions and blank portions of said structure and of said containing shell in said section planes, said planar cross-sections being sorted from below towards an area above;
    prearranging a fixed frame on which a moving unit slides, said moving unit suitable for alternately depositing a granular material layer and spraying a binding material in a liquid form on said granular material layer;
    depositing a first uniform horizontal layer of said granular material by said moving unit, said first layer having a thickness related to said prefixed vertical pitch;
    spraying a predetermined amount of said binding material by said moving unit on said first layer of said granular material, said spraying being limited to said filled areas of a first planar cross-section;
    vertically raising said moving unit with respect to said fixed frame;
    depositing a second uniform horizontal layer of granular material on said first layer and spraying a predetermined amount of binding material on said second layer, said spraying being limited to said filled areas of a second cross-section;
    repeating said step of depositing said granular material and repeating said step of spraying a predetermined amount of binding material at said filled areas of each respective cross-section until a last layer is complete, thus obtaining at least one monolithic body corresponding to said building or other masonry construction structure, and at least one monolithic body corresponding to said containing shell, wherein inner blank spaces are filled with loose granular material; and
    demolishing said containing shell and removing said loose granular material obtaining said building or other masonry construction structure.

2. A method, according to claim 1, wherein, in order to perform said step of depositing said granular material and said step of spraying said binding material according to said model of said structure and of said shell, a calculation step is provided for calculating a program matrix used to actuate said moving unit, said moving unit having a plurality of electrically actuated valves for opening and closing respective distributing nozzles, said opening and closing performed by a control unit which operates according to said program matrix.

3. A method, according to claim 1, further comprising pressing each uniform layer of said granular material by means of a pressing element associated with said moving unit, said pressing element suitable for applying a predetermined pressure on said uniform layer of said granular material, said pressing being carried out before said binding material is sprayed upon the respective layer.

4. A method, according to claim 1, wherein said containing shell has vertical or sloping portions having cross sections that form a closed shape selected from the group consisting of:
    a regular geometric shape;
    an irregular geometric shape; and
    a shape suitable for externally contouring the plan of said structure, said shape located at a predetermined minimum distance from said plan.

5. A method, according to claim 1, wherein said binding material is a two-component inorganic binding material comprising:
    a liquid component which is sprayed by said moving unit;
    a catalyst.

6. A method, according to claim 5, wherein said liquid component, contains inorganic substances.

7. A method, according to claim 5, wherein the contact between said liquid component and said catalyst occurs on the deposited layer of said granular material.

8. A method, according to claim 5, wherein said catalyst is a powder solid, and is dispersed among the granular material to form a mixture.

9. A method, according to claim 8, wherein said catalyst has a granulometry finer than the granulometry of said granular material.

10. A method, according to claim 5, wherein said component has a viscosity value set between $1\times10^{-3}$ Ns/m and $2\times10^{-3}$ Ns/m and a surface tension value set between 0.07 N/m and 2 N/m.

11. A method, according to claim 5, wherein said catalyst contains metal oxides.

12. A method, according to claim 1, wherein said granular material has a granulometry set between 0.01 mm and 65 mm.

13. A method, according to claim 8, wherein a step is provided of adding high tensile strength reinforcing fibres to said mixture of said granular material and of said catalyst, said reinforcing fibres selected from the group consisting of:
   glass fibres;
   carbon fibres; and
   nylon fibres.

14. A method, according to claim 1, wherein a step is provided of laying a network of a stiff, chloride-corrosion-resistant material for reinforcing a portion of said monolithic body corresponding to a wide-span floor of said building.

15. A method, according to claim 1, wherein said step of spraying is carried out according to a predetermined path of said moving unit in a horizontal plane, said path comprising a longitudinal spraying stroke, wherein said longitudinal spraying stroke is followed by at least one further, reversely directed longitudinal spraying stroke, said reversely directed stroke preceded by a transverse shifting movement of said moving unit.

16. A method, according to claim 1, wherein said step of spraying is carried out along a whole width of the layer of the granular material, or a substantial part of said width, through a plurality of nozzles arranged adjacent to each other along said moving unit.

17. A method, according to claim 1, wherein said predetermined amount of binding material is such that the binding material penetrates the whole thickness of a layer in at least one portion of said filled areas, said portion selected from the group consisting of:
   the contour of said filled areas, creating a skin with a determined thickness to fulfil the requirements for structural stability;
   a cross pattern inside said filled areas, forming recesses where unbound granular material is present, and a combination thereof.

* * * * *